(12) United States Patent
Naito (10) Patent No.: US 6,512,792 B1
(45) Date of Patent: Jan. 28, 2003

(54) MOVING IMAGE ENCODING APPARATUS WITH A QUANTIZATION STEP SIZE DIFFERENT FROM THE DEQUANTIZATION STEP SIZE

(75) Inventor: Yukihiro Naito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/226,057

(22) Filed: Jan. 5, 1999

(30) Foreign Application Priority Data

Jan. 8, 1998 (JP) .......................................... 10-002213

(51) Int. Cl.⁷ ................................................ H04N 7/12
(52) U.S. Cl. .................................................. 375/240.05
(58) Field of Search ....................... 375/240.03, 240.26, 375/240.05, 240.12; H04N 7/12, 7/26

(56) References Cited

U.S. PATENT DOCUMENTS 5,822,005 A * 10/1998 Horne ................... 375/240.03

FOREIGN PATENT DOCUMENTS

| JP | 61-173592 | 8/1986 |
|---|---|---|
| JP | 61-173593 | 8/1986 |
| JP | 65-3586 | 1/1988 |
| JP | 2-154588 | 6/1990 |
| JP | 3-190482 | 8/1991 |
| JP | 5-49018 | 2/1993 |
| JP | 5-130489 | 5/1993 |
| JP | 5-130592 | 5/1993 |
| JP | 5-227523 | 9/1993 |
| JP | 6-62392 | 3/1994 |
| JP | 6-70311 | 3/1994 |
| JP | 6-224773 | 8/1994 |
| JP | 6-343167 | 12/1994 |
| JP | 7-30897 | 1/1995 |
| JP | 9-37268 | 2/1997 |
| JP | 9-84024 | 3/1997 |
| JP | 9-200766 | 7/1997 |

* cited by examiner

Primary Examiner—Young Lee
(74) Attorney, Agent, or Firm—Scully, Scott, Murphy & Presser (57) ABSTRACT

A moving image encoding apparatus which has a similar function to noise elimination by a pre-processing filter without requiring a large amount of calculation and a large apparatus scale. A quantization circuit performs quantization with a quantization step size of a characteristic different from that of a quantization step size which is used by a dequantization circuit and an encoding circuit to eliminate coding of noise components mixed in an input image. An encoding control circuit controls the noise elimination characteristic of the quantization circuit with a noise elimination parameter based on an output of a moving/still discrimination circuit and stored contents of a transmission buffer.

14 Claims, 10 Drawing Sheets

MOVING IMAGE ENCODING APPARATUS WITH A QUANTIZATION STEP SIZE DIFFERENT FROM THE DEQUANTIZATION STEP SIZE

BACKGROUND OF THE INVENTION

1. Field of the Invention

The present invention relates to a moving image encoding apparatus, and more particularly to a moving image encoding apparatus for use with a visual telephone system or a video conference system.

2. Description of the Related Art

Conventionally, a moving picture encoding system which employs motion compensation and orthogonal transform in combination is used frequently for compression coding of a moving image signal. Meanwhile, an input image signal inputted to an encoding apparatus includes high frequency components of noise, and in order to prevent deterioration of the coding efficiency by such high frequency components, a pre-processing filter is used to eliminate noise.

As such pre-processing filters, a recursive interframe filter for suppressing temporal noise components and an intraframe filter for suppressing spatial noise components are known. For a recursive interframe filter, a first-order recursive filter for pixels which includes a frame memory for one frame is widely used, and for an intraframe filter, a two-dimensional filter of 3×3 elements is widely used. Moving image encoding apparatus which employ such pre-processing filters as described above are disclosed in Japanese Patent Laid-Open No. 154588/1990, Japanese Patent Laid-Open No. 84024/1997, and so forth.

Figure 9:
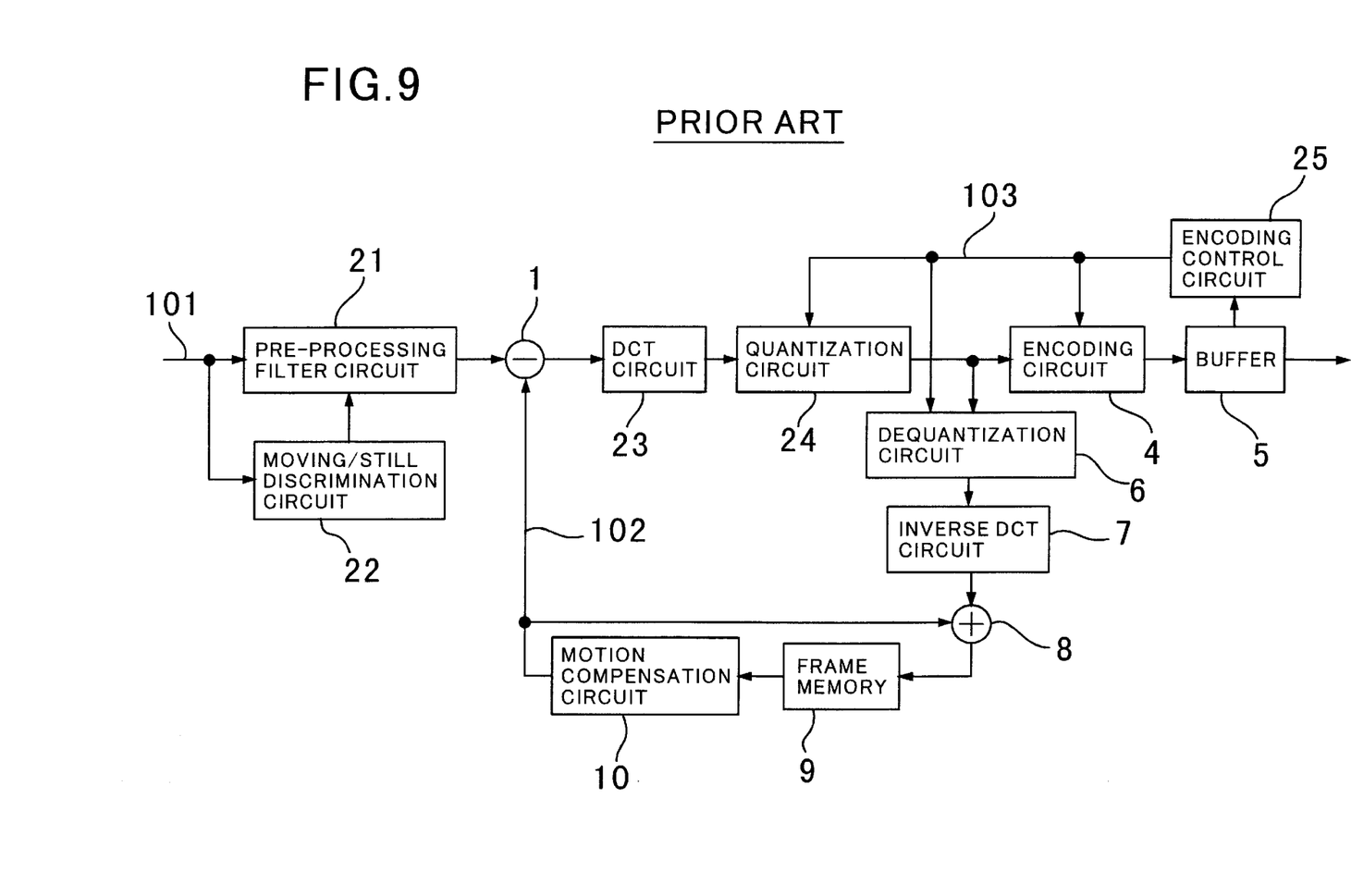
FIG. 9 is a block diagram showing a construction of a conventional moving image encoding apparatus.

FIG. 9 shows an example of a moving image encoding apparatus which employs a pre-processing filter mentioned above. Conventional moving image compression coding is described below with reference to FIG. 9. The moving image encoding apparatus shown processes an input image 101 in units of a pixel block (for example, 16×16 pixels or 8×8 pixels).

In particular, a pre-processing filter circuit 21 filters a pixel block of the input image 101 based on a result of discrimination of a moving/still discrimination circuit 22 and outputs a result of the filtering to a subtractor 1. The subtractor 1 subtracts a predicted image 102 outputted from a motion compensation circuit 10 from the pixel block filtered by the pre-processing filter circuit 21.

A result of the subtraction of the subtractor 1 is inputted through a DCT circuit 23 and a quantization circuit 24 to an encoding circuit 4, by which it is encoded, and an output of the encoding circuit 4 is stored into a buffer 5.

The output of the quantization circuit 24 is inputted not only to the encoding circuit 4 but also to another adder 8 through a dequantization circuit 6 and an inverse DCT circuit 7. The adder 8 adds the predicted image 102 to the output of the quantization circuit 24, that is, an output of the inverse DCT circuit 7, and an output of the adder 8 is stored into a frame memory 9.

A quantization step size 103 which is used by the quantization circuit 24 is determined by an encoding control circuit 25. The quantization step size 103 used by the quantization circuit 24 is inputted also to the encoding circuit 4 and the dequantization circuit 6 simultaneously.

The encoding circuit 4 encodes the quantization step size 103 into coded data while the dequantization circuit 6 performs dequantization with the quantization step size 103.

Figure 10:
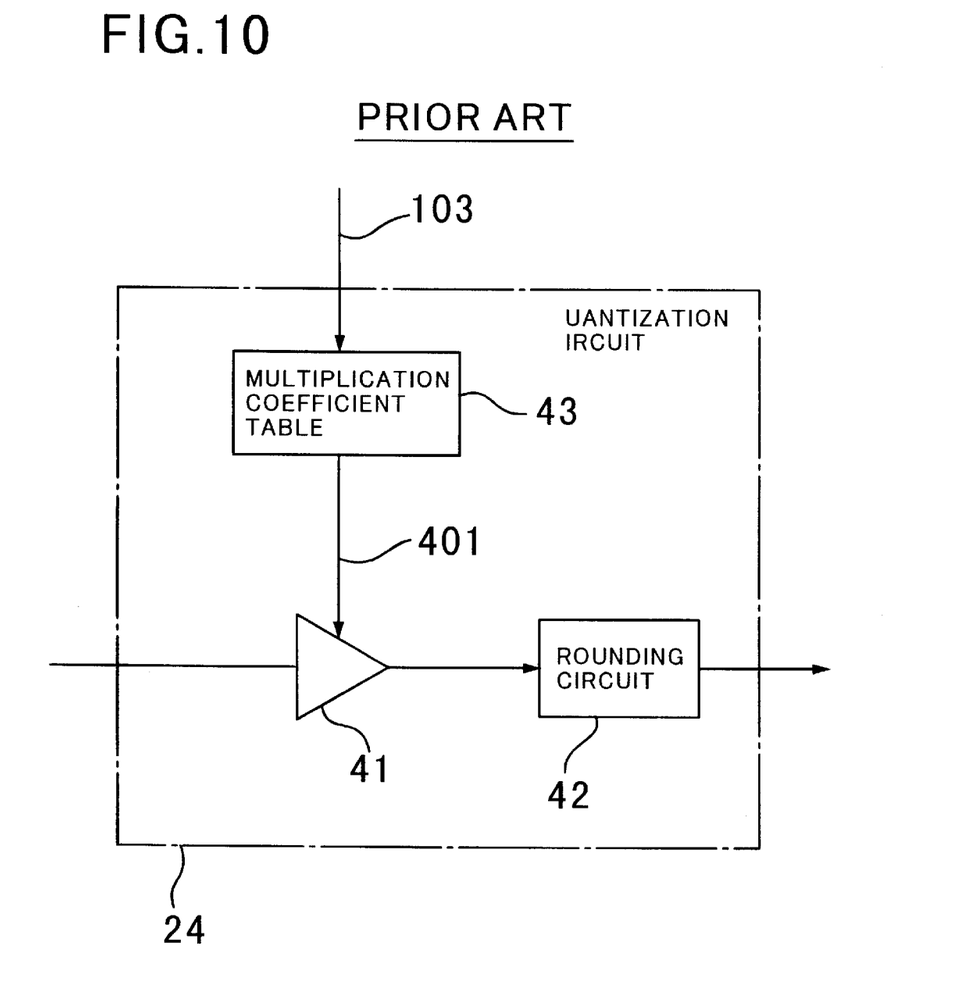
FIG. 10 is a block diagram showing a construction of a quantization circuit of the conventional moving image encoding apparatus of FIG. 9.

Referring to FIG. 10, the quantization circuit 24 includes a multiplier 41, a rounding circuit 42, and a multiplication coefficient table 43. A quantization step size 103 inputted to the quantization circuit 24 is varied in units of a pixel block, but is constant during processing of the same pixel block.

The multiplication coefficient table 43 includes a correspondence between the quantization step size 103 and a multiplication coefficient 401 which is used by the multiplier 41. For example, where the dequantization circuit 6 should output a result of multiplication of an input thereto by the quantization step size 103, the multiplication coefficient table 43 in the quantization circuit 24 is set so that the input is multiplied by an inverse number to the quantization step size 103.

At the top of processing of a pixel block, a multiplication coefficient 401 corresponding to the input of the quantization step size 103 is set to the multiplier 41. After the multiplication coefficient 401 is set, an input to the quantization circuit 24 is multiplied by the multiplication coefficient 401 by the multiplier 41. Then, an output of the multiplier 41 is rounded by the rounding circuit 42, and an output of the rounding circuit 42 is outputted as an output of the quantization circuit 24.

In the conventional moving image encoding apparatus described above, noise elimination from an input image signal in moving image encoding processing, particularly in encoding processing at a low bit rate, is an important factor to assure a high encoding efficiency. However, the conventional moving image encoding apparatus is disadvantageous in that a large amount of calculation is required for implementation of a pre-processing filter and this requires a large apparatus scale.

SUMMARY OF THE INVENTION

It is an object of the present invention to provide a moving image encoding apparatus which has a similar function to noise elimination by a pre-processing filter without requiring a large amount of calculation and a large apparatus scale.

In order to attain the object described above, according to the present invention, there is provided a moving image encoding apparatus, comprising prediction means for predicting a pixel block in a current frame of an input moving image signal from a preceding frame of the input moving image signal using motion compensation to produce a predictive error frame, orthogonal transform means for orthogonally transforming the predictive error frame, quantization means for quantizing the orthogonally transformed frame, encoding means for encoding the quantized frame, and a transmission buffer for storing the frame encoded by the encoding means, the quantization means quantizing the orthogonally transformed frame from the orthogonal transform means with a quantization step size having a different characteristic from that of a quantization step size which is used in dequantization included in the prediction processing of the prediction means and is used for the encoding processing by the encoding means.

Preferably, the moving image encoding apparatus further comprises moving/still discrimination means for detecting a moving area and a still area of the input image signal, and control means for controlling the quantization characteristic of the quantization means based on an output of the moving/still discrimination means and a remaining capacity of the transmission buffer.

In the moving image encoding apparatus, the quantization means quantizes the orthogonally transformed frame from the orthogonal transform means with a quantization step size having a different characteristic from that of a quantization step size which is used in dequantization included in the prediction processing, particularly, in motion compensation, of the prediction means and is used for the encoding processing by the encoding means. Consequently, the moving image encoding apparatus is advantageous in that it can be provided with a similar function to noise elimination by a pre-processing filter without requiring a large amount of calculation and a large apparatus scale.

Preferably, the quantization means quantizes the orthogonally transformed frame from the orthogonal transform means with a step size with which the orthogonally transformed frame is attenuated different from that which is used for the encoding operation by the encoding means. With the moving image encoding apparatus, a temporal variation of the input image becomes less likely to be encoded, and a temporal noise component elimination effect similar to that achieved where a recursive interframe filter is used can be achieved without using a recursive interframe filter.

Preferably, the quantization means quantizes the orthogonally transformed frame from the orthogonal transform means while attenuating high frequency components of the orthogonally transformed frame in higher degrees than low frequency components of the orthogonally transformed frame. With the moving image encoding apparatus, high frequency components of a spatial variation of the input signal become less likely to be encoded, and a spatial noise elimination effect similar to that achieved where an intraframe filter is used can be achieved without using an intraframe filter.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
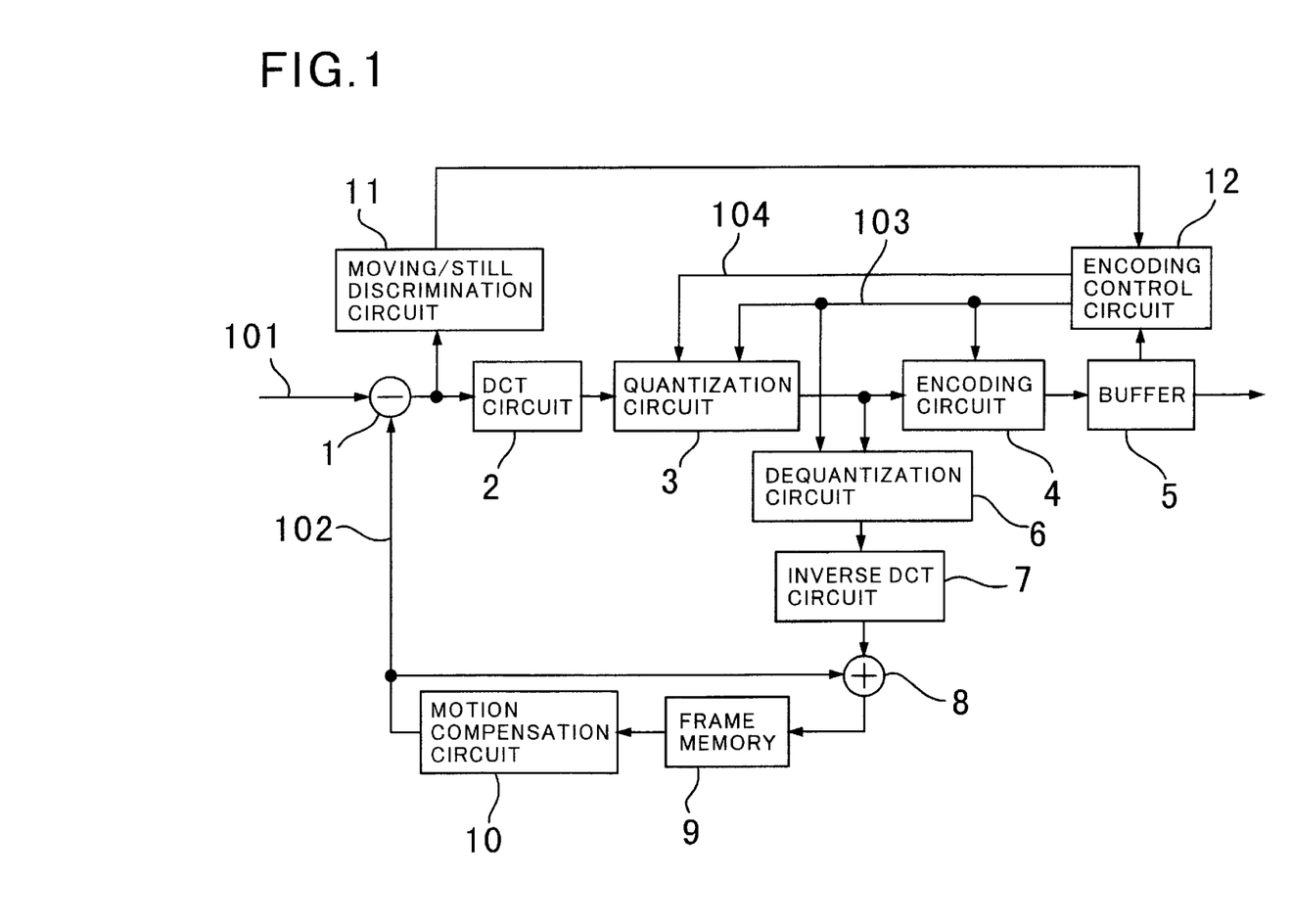
FIG. 1 is a block diagram showing a construction of a moving image encoding apparatus to which the present invention is applied.

Referring first to FIG. 1, there is shown a construction of a moving image encoding apparatus to which the present invention is applied. The moving image encoding apparatus shown includes a subtractor 1, a DCT circuit 2, a quantization circuit 3, an encoding circuit 4, a buffer 5, a dequantization circuit 6, an inverse DCT circuit 7, an adder 8, a frame memory 9, a motion compensation circuit 10, a moving/still discrimination circuit 11, and an encoding control circuit 12.

An input image 101 is processed in units of a pixel block of, for example, 16×16 pixels or 8×8 pixels. The subtractor 1 calculates a difference between a pixel block of the input image 101 and a predicted image 102. The difference calculated by the subtractor 1 is inputted through the DCT circuit 2 and the quantization circuit 3 to the encoding circuit 4, by which it is encoded. Then, an output of the encoding circuit 4 is stored into the buffer 5.

The output of the quantization circuit 3 is outputted to the encoding circuit 4 and is outputted also to the adder 8 through the dequantization circuit 6 and the inverse DCT circuit 7. The adder 8 adds the predicted image 102 to the output of the quantization circuit 3, and an output of the adder 8 is stored into the frame memory 9.

The quantization step size 103 used by the quantization circuit 3 is determined by the encoding control circuit 12. The quantization step size 103 used by the quantization circuit 3 is simultaneously inputted also to the encoding circuit 4 and the dequantization circuit 6. The encoding circuit 4 encodes the coded data inputted thereto from the quantization circuit 3 with the quantization step size 103 while the dequantization circuit 6 performs dequantization with the quantization step size 103.

The encoding control circuit 12 outputs the quantization step size 103 and outputs a noise elimination parameter 104 to the quantization circuit 3. The noise elimination parameter 104 is used to control the type and the strength of the noise elimination function of the quantization circuit 3 and is determined from moving/still information of an object pixel block discriminated by the moving/still discrimination circuit 11, contents of the buffer 5 and so forth. Processing operation of the moving/still discrimination circuit 11 is similar to the processing operation of the moving/still discrimination circuit of the conventional apparatus described hereinabove with reference to FIGS. 9 and 10, and overlapping description of it is omitted here to avoid redundancy.

Figure 2:
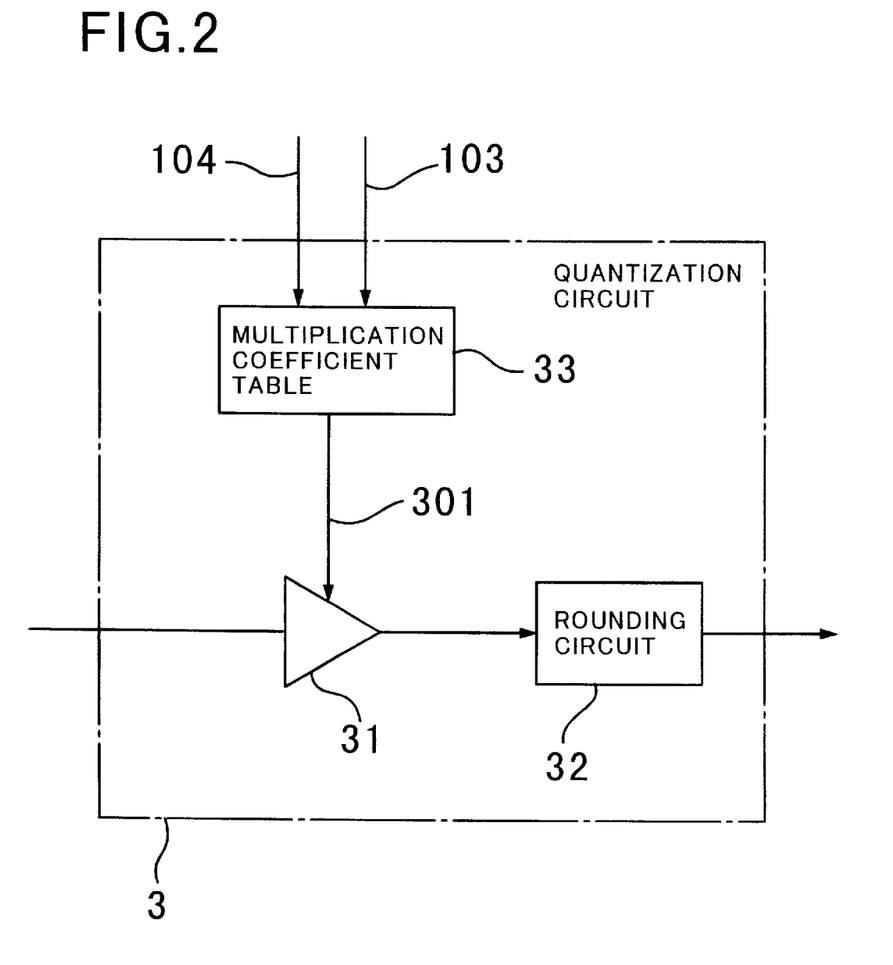
FIG. 2 is a block diagram showing a construction of a quantization circuit shown in FIG. 1.

FIG. 2 shows a construction of the quantization circuit 3 shown in FIG. 1. Referring to FIG. 2, the quantization circuit 3 shown includes a multiplier 31, a rounding circuit 32, and a multiplication coefficient table 33.

The quantization step size 103 and the noise elimination parameter 104 inputted to the quantization circuit 3 are varied in units of a pixel block, but are constant during processing of a same pixel block.

The multiplication coefficient table 33 includes a table in which a correspondence between the quantization step size 103 and noise elimination parameter 104 and a multiplication coefficient 301 used by the multiplier 31, and receives the quantization step size 103 and the noise elimination parameter 104 as inputs thereto and sets a corresponding multiplication coefficient 301 to the multiplier 31.

In the present moving image encoding apparatus, setting of the multiplication coefficient 301 is performed only once at the top of processing for each pixel block. After the multiplication coefficient 301 is set, multiplication by the multiplier 31 is performed for an input to the quantization circuit 3, and a result of the multiplication is rounded by the rounding circuit 32 and a result of the rounding is outputted as an output of the quantization circuit 3 from the rounding circuit 32.

Figure 3:
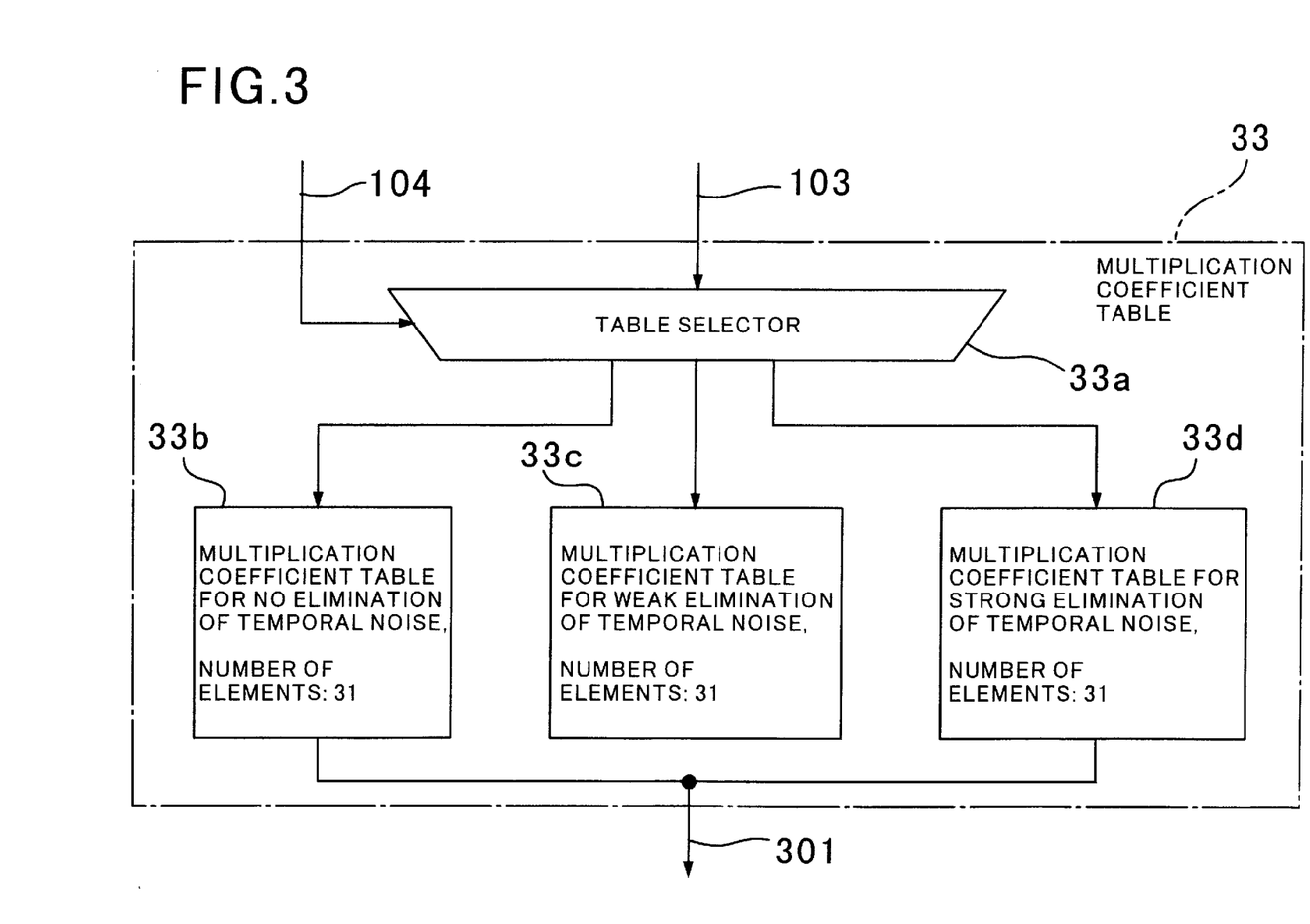
FIG. 3 is a block diagram showing a construction of a multiplication coefficient table shown in FIG. 2.

FIG. 3 shows a construction of the multiplication coefficient table 33 shown in FIG. 2. Referring to FIG. 2, the multiplication coefficient table 33 includes a table selector 33a, a multiplication coefficient table 33b for no elimination of temporal noise, a multiplication coefficient table 33c for weak elimination of temporal noise and a multiplication coefficient table 33d for strong elimination of temporal noise.

Particularly, FIG. 3 shows a construction of the multiplication coefficient table 33 where the number of available different values of the quantization step size 103 is 31 and the number of degrees of strength of temporal noise is three. In this instance, each of the multiplication coefficient table 33b for no elimination of temporal noise, multiplication coefficient table 33c for weak elimination of temporal noise and multiplication coefficient table 33d for strong elimination of temporal noise has 31 factors accommodated therein.

Operation of the moving image encoding apparatus of the present embodiment is described with reference to FIGS. 1 to 3. The moving image encoding apparatus exhibits an effect similar to that which is exhibited when the input image 101 is acted upon by are cursive interframe filter for eliminating temporal noise components.

In particular, a difference between a pixel block of the input image 101 and a pixel block of the predicted image 102 is calculated by the subtractor 1. Based on energy of the difference signal, it is discriminated by the moving/still discrimination circuit 11 whether or not the object pixel block is a moving area or a still area.

If a result of the discrimination of the moving/still discrimination circuit 11 is a moving area, then the object pixel block is classified into a plurality of levels based on the magnitude of the energy of the difference signal, but if the result of the discrimination of the moving/still discrimination circuit 11 is a still area, then the object pixel model is classified into a plurality of levels based on for how many frames a still condition continues. Then, a result of the classification is outputted to the encoding control circuit 12. The encoding control circuit 12 determines a noise elimination parameter 104 based on the output of the moving/still discrimination circuit 11 and stored contents of the buffer 5.

Where the object pixel block is a still area, temporal noise contents are suppressed strongly, but where the object pixel block is a moving area, temporal noise components are suppressed weakly. This is because otherwise the subjective picture quality is deteriorated since suppression of temporal noise components also suppresses difference information originating in original movement simultaneously. Further, where the buffer 5 has a sufficient remaining capacity, the strength of noise elimination is set to a rather low level, but where the buffer 5 does not have a sufficient remaining capacity, the strength of noise elimination is set to a rather high level.

Now, operation of the quantization circuit 3 of FIG. 1 is described with reference to FIGS. 2 and 3. The quantization circuit 3 varies a quantization step size 103 and a noise elimination parameter 104 in units of a pixel block, but keeps them constant during processing of a same pixel block.

The multiplication coefficient table 33 includes the multiplication coefficient tables 33b to 33d in which different correspondences between the quantization step size 103 and noise elimination parameter 104 and the multiplication coefficient 301 which is used by the multiplier 31. Here, the dequantization circuit 6 outputs a result of multiplication of an input thereto by the quantization step size 103.

If it is designated by the noise elimination parameter 104 that elimination of temporal noise components should not be performed, then the table selector 33a of the quantization circuit 3 selects, as a destination of outputting of the quantization step size 103, the multiplication coefficient table 33b in which inverse numbers to available values of the quantization step size 103 are stored from within the multiplication coefficient table 33. Consequently, an inverse number to the quantization step size 103 stored in the multiplication coefficient table 33b is outputted as a multiplication coefficient 301. For example, where the number of available different values of the quantization step size 103 is 31, 31 different inverse numbers are stored in the multiplication coefficient table 33b.

On the other hand, if it is designated by the noise elimination parameter 104 that elimination of temporal noise components should be performed, a different table is selected depending upon the strength level of noise elimination. The tables are set so that, as the strength of noise elimination increases, a multiplication coefficient 301 of a decreasing value is outputted for the same quantization step size 103.

In short, where the strength level of noise elimination is low, the multiplication coefficient table 33c for weak elimination of temporal noise in the multiplication coefficient table 33 is selected as a destination of outputting of the quantization step size 103 by the table selector 33a, but where the strength level of noise elimination is high, the multiplication coefficient table 33d for strong elimination of temporal noise in the multiplication coefficient table 33 is selected as a destination of outputting of the quantization step size 103 by the table selector 33a.

Setting of the multiplication coefficient 301 to a value lower than that where noise elimination should not be performed signifies to encode an input to the quantization circuit 3 while attenuating it from that in original quantization. Consequently, a temporal variation of the input image 101 becomes less likely to be encoded, and a similar effect to that achieved where a temporal noise elimination filter is used can be achieved.

Figure 4:
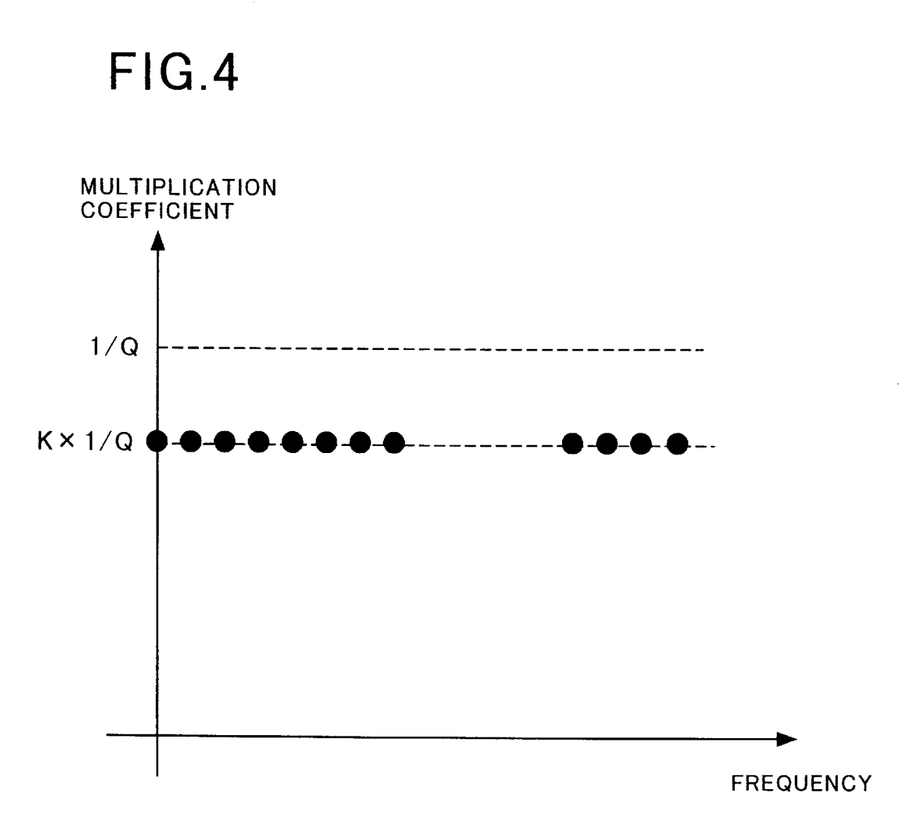
FIG. 4 is a diagram illustrating operation of the quantization circuit of FIG. 2.

FIG. 4 illustrates operation of the quantization circuit 3 of the moving image encoding apparatus described above. More particularly, FIG. 4 illustrates a correspondence between factors of a pixel block inputted to the quantization circuit 3 of the moving image encoding apparatus after they are re-arranged by zigzag scanning or the like such that they stand from lower frequency components to higher frequency components and different values of the multiplication coefficient 301 set for the individual factors.

In the moving image encoding apparatus, the same multiplication coefficient is used for different factors of the same pixel block. The symbol K in FIG. 4 represents a variable which designates the strength of elimination of temporal noise components, and where K is 1, no noise elimination is performed, but as K approaches 0, temporal noise elimination is performed in an increasing strength.

Figure 5:
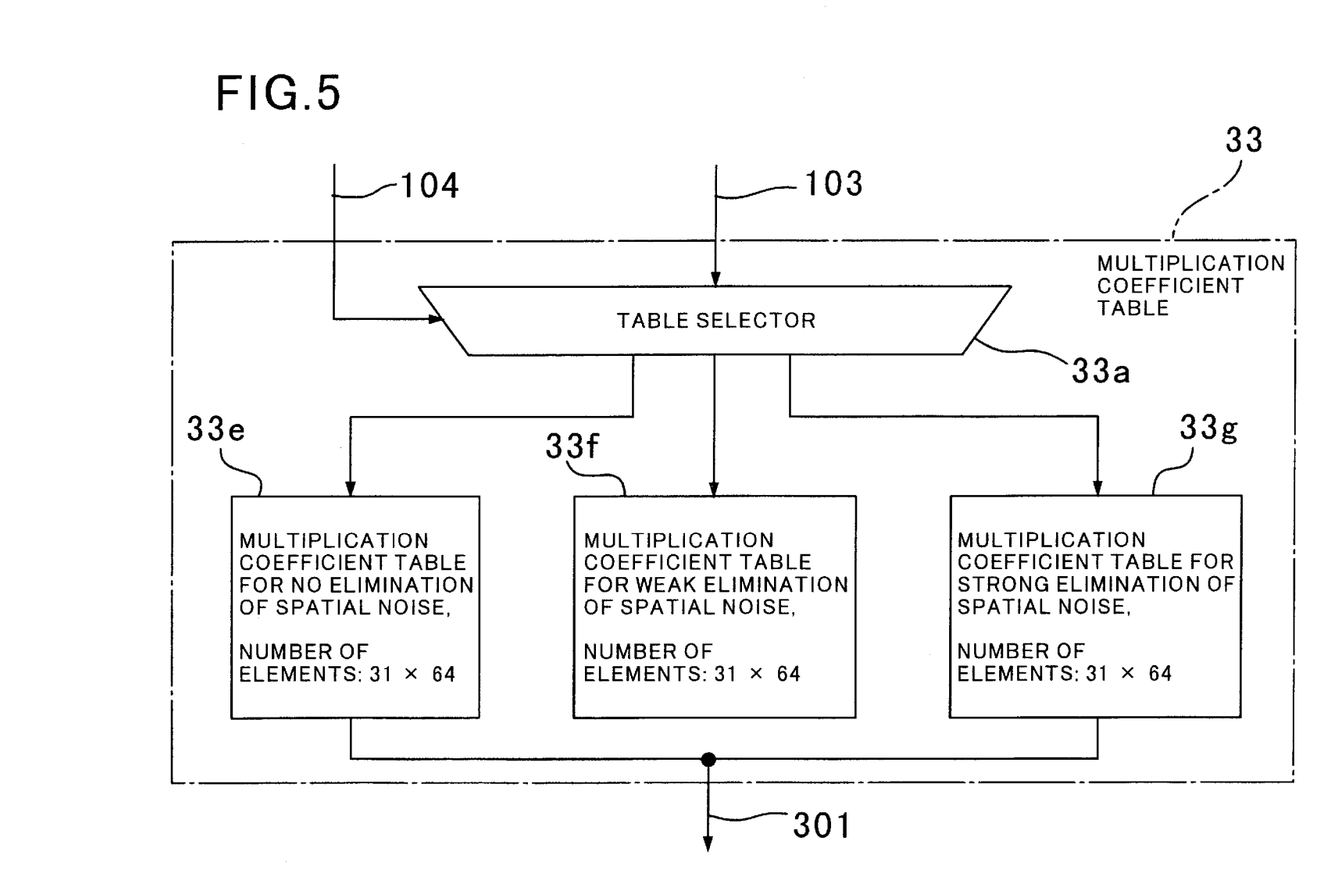
FIG. 5 is a block diagram showing another construction of the multiplication coefficient table shown in FIG. 2.

FIG. 5 shows another construction of the multiplication coefficient table shown in FIG. 2. Referring to FIG. 5, the multiplication coefficient table shown is denoted at 33 similarly and includes a table selector 33a, a multiplication coefficient table 33e for no elimination of spatial noise, a multiplication coefficient table 33f for weak elimination of spatial noise, and a multiplication coefficient table 33g for strong elimination of spatial noise.

More particularly, FIG. 5 shows a construction of the multiplication coefficient table 33 where the number of pixels in a block is 64, the number of available values of the quantization step size 103 is 31 and the number of available values of the strength of spatial noise elimination is 3. In this instance, each of the multiplication coefficient table 33e for no elimination of spatial noise, multiplication coefficient table 33f for weak elimination of spatial noise and multiplication coefficient table 33g for strong elimination of spatial noise has 31×64 factors stored therein.

Where the multiplication coefficient table 33 of FIG. 5 is employed, in the moving picture encoding apparatus, a similar effect to that achieved where a spatial noise elimination filter for eliminating spatial noise components is applied to an input image 101 can be achieved. Referring to FIG. 1, the encoding control circuit 12 determines a noise elimination parameter 104 based on an output of the moving/still discrimination circuit 11 and stored contents of the buffer 5.

Where the object pixel block is a still area, spatial noise contents are suppressed strongly, but where the object pixel block is a moving area, spatial noise components are suppressed weakly. This is because suppression of spatial noise components in a still area results in deterioration of the resolution and hence results in deterioration of the subjective picture quality.

On the other hand, suppression of spatial noise components in a moving area has a less influence on the subjective picture quality and can improve the encoding efficiency. Further, where the buffer 5 has a sufficient remaining capacity, the strength of noise elimination is set to a rather low level, but where the buffer 5 does not have a sufficient remaining capacity, the strength of noise elimination is set to a rather high level. In this manner, where the multiplication coefficient table 33 of FIG. 5 is employed, different values are set to different factors in a pixel block.

Now, operation of the quantization circuit 3 where the multiplication coefficient table 33 of FIG. 5 is employed is described with reference to FIGS. 2 and 5. The quantization step size 103 and the noise elimination parameter 104 are fixed during processing of a same pixel block similarly as in the quantization circuit 3 where the multiplication coefficient table 33 of FIG. 3. However, the multiplication coefficient 301 to be supplied to the multiplier 31 is different for different factors in the pixel block.

If it is designated by the noise elimination parameter 104 that elimination of spatial noise components should not be performed, then the table selector 33a selects, as a destination of outputting of the quantization step size 103, the multiplication coefficient table 33e in which inverse numbers to available values of the quantization step size 103 are stored from within the multiplication coefficient table 33. Consequently, an inverse number to the quantization step size 103 stored in the multiplication coefficient table 33e is outputted as a multiplication coefficient 301. In this instance, the multiplication coefficient 301 has a fixed value for all factors in the pixel block.

On the other hand, if it is designated by the noise elimination parameter 104 that elimination of spatial noise components should be performed, such a table is selected that, for low frequency components of the output of the DCT circuit 2 inputted to the quantization circuit 3, the value of the multiplication coefficient 301 to be outputted is equal to that in original quantization, but for higher frequency components, the value of the multiplication coefficient 301 to be outputted is attenuated in an increasing degree from that in ordinary quantization as the frequency increases.

In particular, where the strength level of noise elimination is low, the multiplication coefficient table 33f for weak elimination of spatial noise in the multiplication coefficient table 33 is selected as a destination of outputting of the quantization step size 103 by the table selector 33a, but where the strength level of noise elimination is high, the multiplication coefficient table 33g for strong elimination of spatial noise in the multiplication coefficient table 33 is selected as a destination of outputting of the quantization step size 103 by the table selector 33a.

Figure 6:
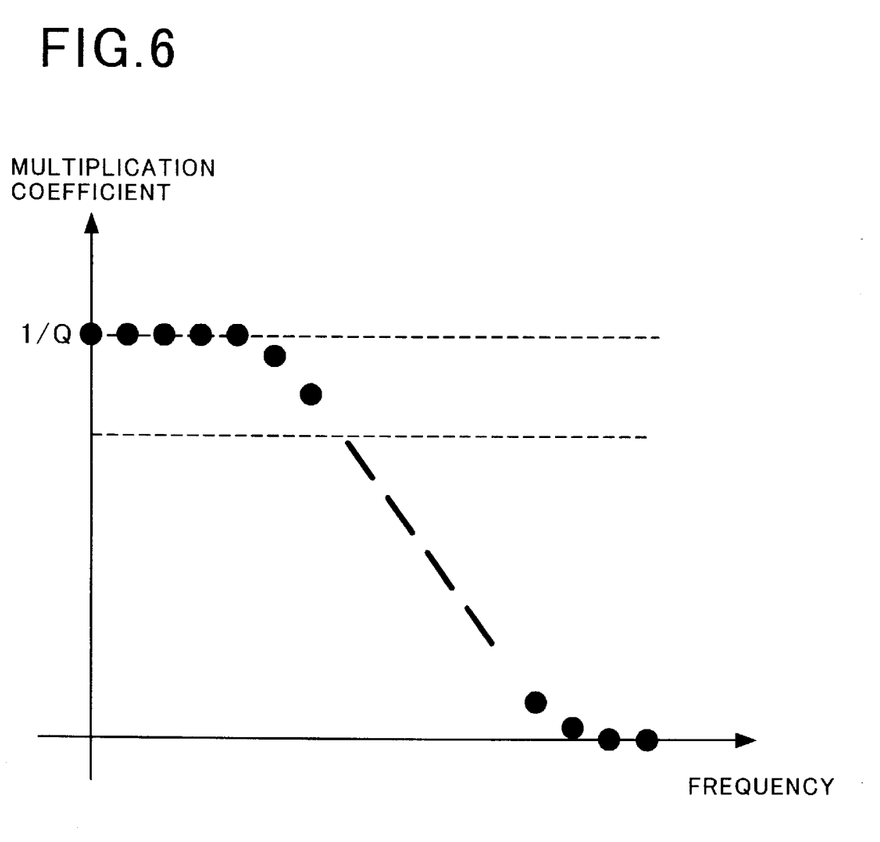
FIG. 6 is a diagram illustrating operation of the quantization circuit of FIG. 2 where the multiplication coefficient table of FIG. 5 is employed.

FIG. 6 illustrates operation of the quantization circuit 3 where the multiplication coefficient table 33 of FIG. 5 is employed. More particularly, FIG. 6 illustrates an example of a correspondence between factors of a pixel block inputted to the quantization circuit 3 of the moving image encoding apparatus where multiplication coefficient table 33 of FIG. 5 is employed after they are re-arranged by zigzag scanning or the like such that they stand from lower frequency components to higher frequency components and different values of the multiplication factor 301 set for the individual factors.

In the moving image encoding apparatus wherein multiplication coefficient table 33 of FIG. 5 is employed, a table in which different multiplication coefficients are stored for different factors of a same pixel block is selected and outputted as the multiplication coefficient 301. A plurality of such tables are prepared for different strength levels of spatial noise elimination designated by the noise elimination parameter 104. Consequently, high frequency components of a spatial variation of the input image 101 become less likely to be encoded, and a similar spatial noise elimination effect to that achieved where an intraframe filter is used can be achieved.

Figure 7:
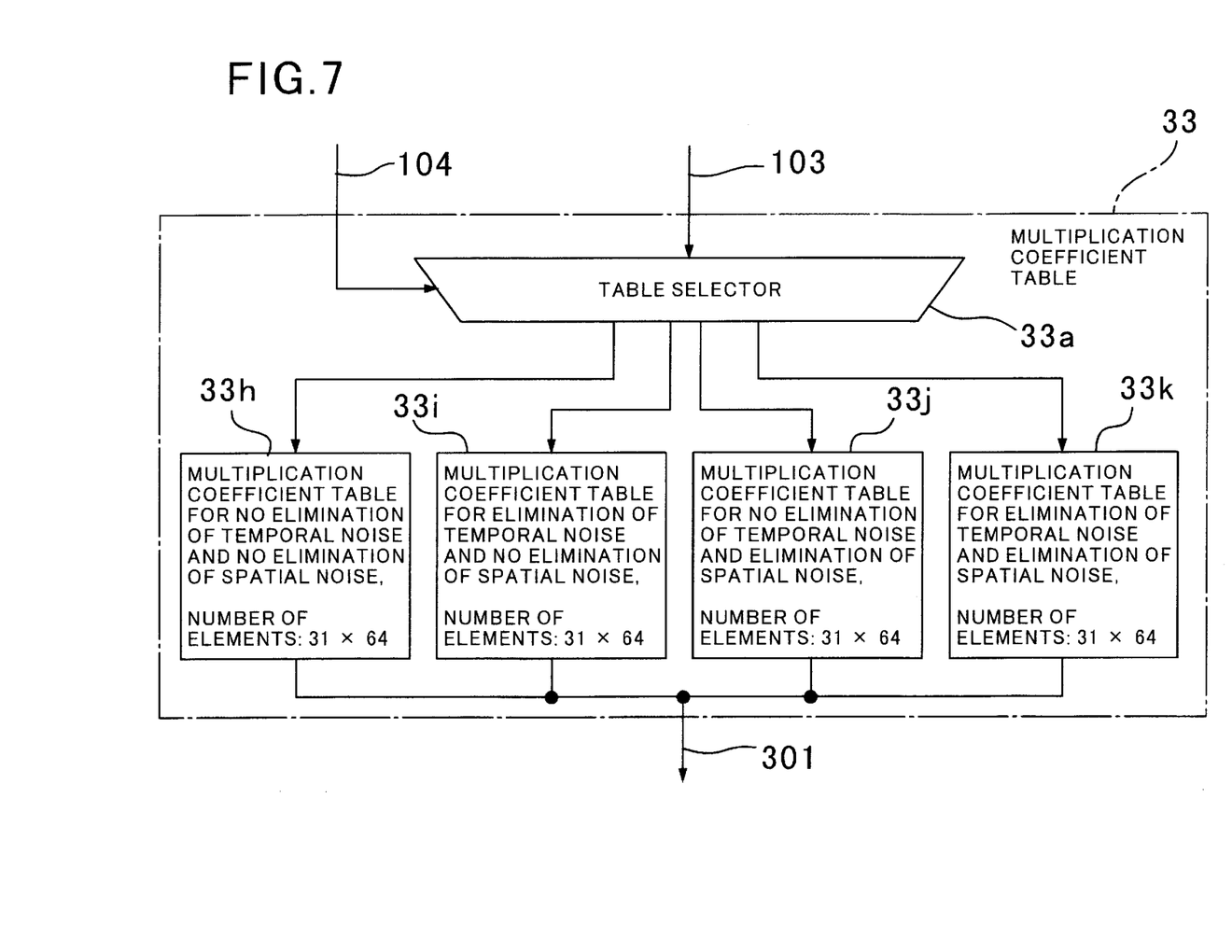
FIG. 7 is a block diagram showing a further construction of the multiplication coefficient table shown in FIG. 2.

FIG. 7 shows a further construction of the multiplication coefficient table shown in FIG. 2. Referring to FIG. 7, the multiplication coefficient table shown is denoted at 33 similarly and includes a table selector 33a, a multiplication coefficient table 33h for no elimination of temporal noise and no elimination of spatial noise, a multiplication coefficient table 33i for elimination of temporal noise and no elimination of spatial noise, a multiplication coefficient table 33j for no elimination of temporal noise and elimination of spatial noise, and a multiplication coefficient table 33k for elimination of temporal noise and elimination of spatial noise.

More particularly, FIG. 7 shows a construction of the multiplication coefficient table 33 where the number of pixels in a block is 64, the number of available values of the quantization step size 103 is 31, the number of available values of the strength of temporal noise elimination is 2, and the number of available values of the strength of spatial noise elimination is 2. In this instance, each of the multiplication coefficient table 33h for no elimination of temporal noise and no elimination of spatial noise, multiplication coefficient table 33i for elimination of temporal noise and no elimination of spatial noise, multiplication coefficient table 33j for no elimination of temporal noise and elimination of spatial noise and multiplication coefficient table 33k for elimination of temporal noise and elimination of spatial noise has 31×64 factors stored therein.

Where the multiplication coefficient table 33 of FIG. 7 is employed, in the moving picture encoding apparatus, a similar effect to that achieved where a recursive interframe filter for eliminating temporal noise components and an intraframe filter for eliminating spatial noise components are applied in combination to the input image 101 can be achieved. Referring to FIG. 1, the encoding control circuit 12 determines a noise elimination parameter 104 based on an output of the moving/still discrimination circuit 11 and stored contents of the buffer 5.

Where the object pixel block is a still area, temporal noise contents are eliminated strongly and spatial noise components are eliminated weakly, but where the object pixel block is a moving area, temporal noise contents are eliminated weakly and spatial noise components are suppressed strongly. Further, where the buffer 5 has a sufficient remaining capacity, the strength of noise elimination is set to a rather low level, but where the buffer 5 does not have a sufficient remaining capacity, the strength of noise elimination is set to a rather high level.

Now, operation of the quantization circuit 3 where the multiplication coefficient table 33 of FIG. 7 is employed is described with reference to FIGS. 2 and 7. In the moving image encoding apparatus wherein the multiplication coefficient table 33 of FIG. 7 is employed, the multiplication coefficient 301 to be supplied to the multiplier 31 is different for different factors in a pixel block similarly as in the moving image encoding apparatus where the multiplication coefficient table 33 of FIG. 5 is employed. A suitable table in the multiplication coefficient table 33 is selected in accordance with the strength level of temporal noise elimination and the strength level of spatial noise elimination designated by the noise elimination parameter 104, and a coefficient for the multiplier 31 is set based on the selected table.

In particular, if it is designated by the noise elimination parameter 104 that no elimination of temporal noise components and no elimination of spatial noise components should be performed, then the table selector 33a selects, as a destination of outputting of the quantization step size 103, the multiplication coefficient table 33h in the multiplication coefficient table 33. However, if elimination of temporal noise components should be performed but no elimination of spatial noise components should be performed, then the table selector 33a selects, as a destination of outputting of the quantization step size 103, the multiplication coefficient table 33i in the multiplication coefficient table 33.

On the other hand, if no elimination of temporal noise components should be performed but elimination of spatial noise components should be performed, then the table selector 33a selects, as a destination of outputting of the quantization step size 103, the multiplication coefficient table 33j in the multiplication coefficient table 33. However, if both of elimination of temporal noise components and elimination of spatial noise components should be performed, then the table selector 33a selects, as a destination of outputting of the quantization step size 103, the multiplication coefficient table 33k in the multiplication coefficient table 33.

Figure 8:
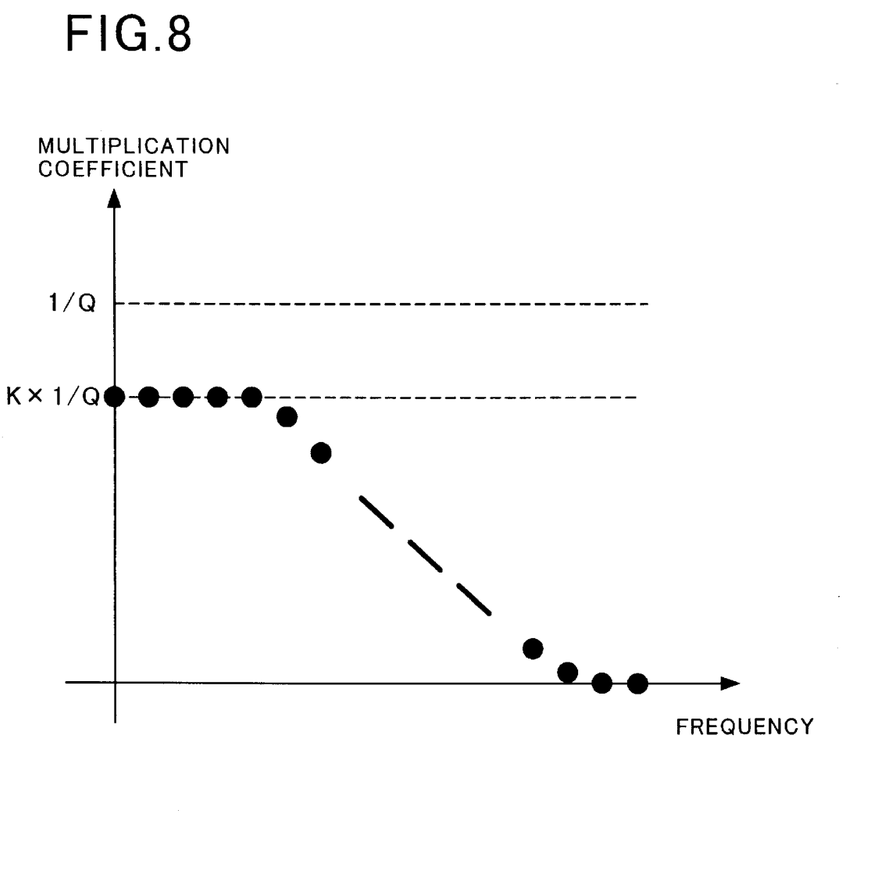
FIG. 8 is a diagram illustrating operation of the quantization circuit of FIG. 2 where the multiplication coefficient table of FIG. 7 is employed.

FIG. 8 illustrates operation of the quantization circuit 3 where the multiplication coefficient table 33 of FIG. 7 is employed. More particularly, FIG. 6 illustrates an example of a correspondence between factors of a pixel block inputted to the quantization circuit 3 of the moving image encoding apparatus where multiplication coefficient table 33 of FIG. 7 is employed after they are re-arranged by zigzag scanning or the like such that they stand from lower frequency components to higher frequency components and different values of the multiplication factor 301 set for the individual factors.

The symbol K in FIG. 8 determines the strength of elimination of temporal noise components similarly to that in FIG. 4, and the variation of the multiplication coefficient with respect to the frequency determines the strength of elimination of spatial noise components. A plurality of such tables are prepared for different strength levels of temporal noise elimination and spatial noise elimination designated by the noise elimination parameter 104 and selectively used. Consequently, a similar temporal and spatial noise elimination effect to that achieved where a recursive interframe filter and an intraframe filter are used in combination can be achieved.

Since a function similar to noise elimination by a pre-processing filter is implemented by quantization processing of the quantization circuit 3 in this manner, the necessity for a pre-processing filter is eliminated, and consequently, the apparatus scale or the calculation amount can be reduced.

While a preferred embodiment of the present invention has been described using specific terms, such description is for illustrative purpose only, and it is to be understood that changes and variations may be made without departing from the spirit or scope of the following claims.

What is claimed is:

1. A moving image encoding apparatus, comprising:
   prediction means for predicting a pixel block in a current frame of an input moving image signal from a preceding frame of the input moving image signal using motion compensation to produce a predictive error frame;
   orthogonal transform means for orthogonally transforming the predictive error frame;
   quantization means for quantizing the orthogonally transformed frame;
   encoding means for encoding the quantized frame;
   a transmission buffer for storing the frame encoded by said encoding means;
   moving/still discrimination means for discriminating a moving area and a still area of the input moving image signal; and
   control means for receiving output from said moving/still discrimination means and remaining capacity of said transmission buffer and for providing a noise elimination parameter to said quantization means;
   said quantization means controlled by said noise elimination parameter quantizing the orthogonally transformed frame from said orthogonal transform means with a quantization step size having a different characteristic from that of a quantization step size which is used in dequantization included in the prediction processing of said prediction means and is used for the encoding processing by said encoding means.

2. A moving image encoding apparatus as claimed in claim 1, wherein said quantization means quantizes the orthogonally transformed frame from said orthogonal transform means with a step size with which the orthogonally transformed frame is attenuated different from that which is used for the encoding operation by said encoding means.

3. A moving image encoding apparatus as claimed in claim 1, wherein said quantization means quantizes the orthogonally transformed frame from said orthogonal transform means with a step size with which the orthogonally transformed frame is attenuated different from that which is used for the encoding operation by said encoding means.

4. A moving image encoding apparatus as claimed in claim 1, wherein said quantization means quantizes the orthogonally transformed frame from said orthogonal transform means while attenuating high frequency components of the orthogonally transformed frame in higher degrees than low frequency components of the orthogonally transformed frame.

5. A moving image encoding apparatus as claimed in claim 1, wherein said quantization means quantizes the orthogonally transformed frame from said orthogonal transform means while attenuating high frequency components of the orthogonally transformed frame in higher degrees than low frequency components of the orthogonally transformed frame.

6. A moving image encoding apparatus as claimed in claim 2, wherein said quantization means quantizes the orthogonally transformed frame from said orthogonal transform means while attenuating high frequency components of the orthogonally transformed frame in higher degrees than low frequency components of the orthogonally transformed frame.

7. A moving image encoding apparatus as claimed in claim 7, wherein said quantization includes a first multiplication coefficient table in which multiplication coefficients to be used for quantization processing where no temporal noise removal should be performed are stored, and a plurality of second multiplication coefficient tables in which multiplication coefficients to be used for the quantization processing which are different for different strengths in temporal noise elimination are stored.

8. A moving image encoding apparatus as claimed in claim 3, wherein said quantization includes a first multiplication coefficient table in which multiplication coefficients to be used for quantization processing where no temporal noise removal should be performed are stored, and a plurality of second multiplication coefficient tables in which multiplication coefficients to be used for the quantization processing which are different for different strengths in temporal noise elimination are stored.

9. A moving image encoding apparatus as claimed in claim 4, wherein said quantization includes a first multiplication coefficient table in which multiplication coefficients to be used for quantization processing where no spatial noise removal should be performed are stored, and a plurality of second multiplication coefficient tables in which multiplication coefficients to be used for the quantization processing which are different for different strengths in spatial noise elimination are stored.

10. A moving image encoding apparatus as claimed in claim 4, wherein said quantization means includes a first multiplication coefficient table in which multiplication coefficients to be used for the quantization where no temporal noise elimination and no spatial noise elimination should be performed, a second multiplication coefficient table in which multiplication coefficients to be used for the quantization processing for different strengths of the temporal noise elimination where no spatial noise elimination should be performed are stored, a third multiplication coefficient table in which multiplication coefficients to be used for the quantization processing for different strengths of the spatial noise elimination where no temporal noise elimination should be performed, and a fourth multiplication coefficient table in which multiplication coefficients to be used for the quantization processing for different strengths of the spatial noise elimination and for different strengths of the temporal noise elimination are stored.

11. A moving image encoding apparatus as claimed in claim 5, wherein said quantization includes a first multiplication coefficient table in which multiplication coefficients to be used for quantization processing where no spatial noise removal should be performed are stored, and a plurality of second multiplication coefficient tables in which multiplication coefficients to be used for the quantization processing which are different for different strengths in spatial noise elimination are stored.

12. A moving image encoding apparatus as claimed in claim 5, wherein said quantization means includes a first multiplication coefficient table in which multiplication coefficients to be used for the quantization where no temporal noise elimination and no spatial noise elimination should be performed, a second multiplication coefficient table in which multiplication coefficients to be used for the quantization processing for different strengths of the temporal noise elimination where no spatial noise elimination should be performed are stored, a third multiplication coefficient table in which multiplication coefficients to be used for the quantization processing for different strengths of the spatial noise elimination where no temporal noise elimination should be performed, and a fourth multiplication coefficient table in which multiplication coefficients to be used for the quantization processing for different strengths of the spatial noise elimination and for different strengths of the temporal noise elimination are stored.

13. A moving image encoding apparatus as claimed in claim 6, wherein said quantization includes a first multiplication coefficient table in which multiplication coefficients to be used for quantization processing where no spatial noise removal should be performed are stored, and a plurality of second multiplication coefficient tables in which multiplication coefficients to be used for the quantization processing which are different for different strengths in spatial noise elimination are stored.

14. A moving image encoding apparatus as claimed in claim 6, wherein said quantization means includes a first multiplication coefficient table in which multiplication coefficients to be used for the quantization where no temporal noise elimination and no spatial noise elimination should be performed, a second multiplication coefficient table in which multiplication coefficients to be used for the quantization processing for different strengths of the temporal noise elimination where no spatial noise elimination should be performed are stored, a third multiplication coefficient table in which multiplication coefficients to be used for the quantization processing for different strengths of the spatial noise elimination where no temporal noise elimination should be performed, and a fourth multiplication coefficient table in which multiplication coefficients to be used for the quantization processing for different strengths of the spatial noise elimination and for different strengths of the temporal noise elimination are stored.

* * * * *